US008626676B2

(12) United States Patent
Xiao

(10) Patent No.: US 8,626,676 B2
(45) Date of Patent: Jan. 7, 2014

(54) REGULARIZED DUAL AVERAGING METHOD FOR STOCHASTIC AND ONLINE LEARNING

(75) Inventor: Lin Xiao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 639 days.

(21) Appl. No.: 12/726,410

(22) Filed: Mar. 18, 2010

(65) Prior Publication Data

US 2011/0231348 A1 Sep. 22, 2011

(51) Int. Cl.
*G06F 15/18* (2006.01)

(52) U.S. Cl.
USPC .......................................................... 706/12

(58) Field of Classification Search
None
See application file for complete search history.

(56) References Cited

U.S. PATENT DOCUMENTS

| 2009/0106173 | A1 | 4/2009 | Andrew et al. | |
|---|---|---|---|---|
| 2011/0131046 | A1* | 6/2011 | Zweig et al. | 704/251 |

OTHER PUBLICATIONS

Langford et al., "Sparse Online Learning via Truncated Gradient", Journal of Machine Learning, Jul. 4, 2008, pp. 1-23.*
Almeida et al., "Parameter Adaptation in Stochastic Optimization", On-Line Learning in Neural Networks, 2009, pp. 111-134.*
Kim et al., "Convergence of a Generalized Subgradient Method for Nondifferentiable Convex Optimization", Mathematical Programming, vol. 50, 1991, pp. 75-80.*
Duchi et al., "Efficient Online and Batch Learning Using Foward Backward Splitting", Journal of Machine Learning Researh, 10, Dec. 2009, pp. 2899-2934.*
Zhang, et al., "Solving Large Scale Linear Prediction Problems Using Stochastic Gradient Descent Algorithms", Retrieved at <<http://www.stat.rutgers.edu/~tzhang/papers.icml04-stograd.pdf>>, Appearing in Proceedings of the 21st International Conference on Machine Learning, Banff, Canada, 2004, pp. 8.
Zinkevich, Martin, "Online Convex Programming and Generalized Infinitesimal Gradient Ascent", Retrieved at <<http://www.cs.ualberta.ca/~maz/publications/ICML03.pdf>>, Proceedings of the Twentieth International Conference on Machine Learning (ICML-2003), Washington DC, 2003, pp. 8.
Auslender, et al., "Interior Projection-Like Methods for Monotone Variational Inequalities", Retrieved at <<http://www.springerlink.com/content/dhbt66xkjwc0yqma/a>>, Mathematical Programming, vol. 4, Issue 1, Sep. 2005, pp. 39-68.
Anderson, et al., "Discrete Choice Theory of Product Differentation", Retrieved at <<http://mitpress.mit.edu/catalog/item/default.asp?ttype=2&tid=5869>>, Oct. 15, 2009, p. 1.

(Continued)

*Primary Examiner* — Jeffrey A Gaffin
*Assistant Examiner* — Paulinho E Smith
(74) *Attorney, Agent, or Firm* — Gonzalez Saggio & Harlan LLP

(57) ABSTRACT

A technology is presented by which a learned mechanism is developed by solving a minimization problem by using regularized dual averaging methods to provide regularized stochastic learning and online optimization. An objective function sums a loss function of the learning task and a regularization term. The regularized dual averaging methods exploit the regularization structure in an online learning environment, in a manner that obtains desired regularization effects, e.g., sparsity under $L_1$-regularization.

17 Claims, 4 Drawing Sheets

(56) References Cited

OTHER PUBLICATIONS

Beck, et al., "Mirro Descent and Nonlinear Projected Subgradient Methods for Convex Optimization", Retrieved at <<http://www.sciencedirect.com/science?_ob=ArticleURL&_udi=B6V8M-47S6T8B-2&_user=10&_rdoc=1&_fmt=&_orig=search&_sort=d&_docanchor=&view=c&_searchStrId=1049071045&_rerunOrigin=scholar.google&_acct=C000050221&_version=1&_urlVersion=0&_userid=10&md5=92a128abd241a50ab175e12ab4c6ebe5>>, May 2003, Operations Research Letters, vol. 31 Issue 1, pp. 167-175.

Ben-Tal, et al., "The Ordered Subsets Mirror Descent Optimization Method with Applications to Tomography", Retrieved at <<http://www2.isye.gatech.edu/~nemirovs/SIAM_ppr_fin.pdf>>, Nov. 20, 2004, pp. 34.

Nemirovsi, Arkadi, "Prox-Method with Rate of Convergance O(1/T) for Variational Inequalities with Lipschitz Continuous Montone Operators and Smooth Convex-Concave Saddle Point Problems", Retrieved at <<http://www2.isye.gatech.edu/~nemiroves/SIOPT_042562-1.pdf>>, 20058, pp. 23.

Nesterov, Yu, "Smooth Minimization of Non Smooth Functions", Retrieved at <<http://www.springerlink.com/content/c7wheayx86u1vfwx/>>, Mathematical Programming, vol. 103, Issue 1, May 2005, pp. 127-152.

Nesterov, Yu, "Excessive Gap Technique in Nonsmooth Convex Minimization", Retrieved at <<http://www.core.ucl.ac.be/~nesterov/Research/Papers/PDSwing-FINAL.pdf>>, 2005, pp. 14.

Nesterov, Yu, "Dual Extrapolation and its Applications for Solving Variational Inequalities and Related Problems", Retrieved at <<http://www.springerlink.com/content/hr2g043g40216278/fulltext.pdf>>, Mathematical Programming, vol. 109, Issue 2-3, Mar. 2007, pp. 319-344.

Ortega, et al., "Iterative Solution of Nonlinear Equations in Several Variables", Retrieved at <<http://www3.cambridge.org/us/catalogue/catalogue.asp?isbn=0898714613>>, Oct. 15, 2009, pp. 1-2.

Andrew, et al., "Scalable Training of L1-Regularized Log-Linear Models", <<http://www.machinelearning.org/proceedings/icml2007/papers/449.pdf>>, Appearing in Proceedings of the 24th International Conference on Machine Learning, Corvallis, Oregon, 2007, pp. 8.

Azuma, Kazuoki, "Weighted Sums of Certain Dependent Random Variables", Retrieved at <<http://projecteuclid.org/DPubS/Repository/1.0/Disseminate?view=body&id=pdf_1&handle=euclid.tmj/1178243286>>, Tohoku Math Journal, vol. 19, No. 3, 1967, pp. 11.

Balakrishnan, et al., "Algorithms for Sparse Linear Classifiers in the Massive Data Setting", Retrieved at <<http://jmlr.csail.mit.edu/papers/volume9/balakrishnan08a/balakrishnan08a.pdf>>, Journal of Machine Learning Research 9, Feb. 2008, pp. 25.

Bartlett, et al., "Adaptive Online Gradient Descent", Retrieved at <<http://www.cs.princeton/edu/~ehazan/papers/EECS-2007-82.pdf>>, University of California at Berkeley, Technical Report No. UCB/EECS-2007-82, Jun. 14, 2007, pp. 14.

Beck, et al., "A Fast Iterative Shrinkage-Threshold Algorithm for Linear Inverse Problems", Retrieved at <<http://iew3.technion.ac.il/~becka/papers/71654.pdf>>, SIAM J. Imaging Sciences, vol. 2, No. 1, Mar. 4, 2009, pp. 183-202.

Bottou, et al., "The Tradeoffs of Large Scale Learning", Retrieved at <<http://books.nips.cc/papers/files/nips20/NIPS2007_0726.pdf>>, 2008, pp. 8.

Bottou, et al., "Large Scale Online Learning", Retrieved at http://yann.lecun.com/exdb/publis/pdf/bottou-lecun-04b.pdf>>, 2003, pp. 8.

Body, et al., "Convex Optimization", Retrieved at <<http://www.stanford.edu/~boyd/cvxbook/bv_cvxbook.pdf>>, Cambridge University Press, 2004, pp. 730.

Bradley, et al., "Differentiable Sparse Coding" Retrieved at <<http://www.ri.cmu.edu/pub_files/2008/12/differentiableSparseCoding.pdf>>, Dec. 2008, pp. 11.

Bredies, et al., "Iterated Hard Shrinkage for Minimization Problems with Sparsity Constraints", Retrieved at <<http://www.math.uni-bremen.de/~diorenz/docs/bredies2006hardshrinkage.pdf>>, Jun. 26, 2006, pp. 26.

Carbonetto, et al., "An Interior-Point Stochastic Approximation Method and an L1-Regularized Delta Rule", Retrieved at <<http://people.cs.ubc.ca/~pcarbo/stocip.pdf>>, University of British Columbia, Vancouver, B.C., Canada, 2008, pp. 10.

Chen, et al., "Atomic Decomposition by Basis Pursuit", Retrieved at <<http://www.stanford.edu/group/SOL/papers/BasisPursuit-SIGEST.pdf>>, Feb. 2, 2001, pp. 31.

Duchi, et al., "Efficient Projections onto the '1-Ball for Learning in High Dimensions", Retrieved at <<http://icml2008.cs.helsinki.fi/papers/361.pdf>>, Appearing in Proceedings of the 25th International Conference on Machine Learning, Helsinki, Finland, 2008, pp. 8.

Ferris, et al., "Interior-Point Methods for Massive Support Vector Machines", Retrieved at <<http://pages.cs.wisc.edu/~ferris/papers/siopt-svm.pdf>>, SIAM J. Optim., vol. 13, No. 3, Jan. 3, 2003, pp. 783-804.

Figueiredo, et al., "Gradient Projection for Sparse Reconstruction: Application to Compressed Sensing and Other Inverse Problems", Retrieved at <<http://www.ece.wisc.edu/~nowak/GPSR.pdf>>, 2007, pp. 13.

Hazan, et al., "Logarithmic Regret Algorithms for Online Convex Optimization", Retrieved at <<http://www.cs.princeton.edu/~ehazan/papers/colt.pdf>>, 2006, pp. 15.

Joachims, Thorsten, "Making Large-Scale Support Vector Machine Learning Practical", Retrieved at <<http://209.85.229.132/search?q=cache:DtjL7g7nHRkJ:www.joachims.org/publications/joachims_99a.ps.gz+Making+Large-Scale+Support+Vector+Machine+Learning+Practical&cd=3&hl=en&ct=clnk>>, 1998, pp. 41-56.

Johansson, et al., "A Randomized Incremental Subgradient Method for Distributed Optimization in Networked Systems", Retrieved at <<http://www.s3.kth.se/~mikaelj/publications/markovusubgradient.pdf>>, Aug. 19, 2009, pp. 12.

Juditsky, et al., "Recursive Aggregation of Estimators by Mirror Descent Algorithm with Averaging", Retrieved at <<http://www.proba.jussieu.fr/pageperso/tsybakov/mirror.pdf>>, Problemsof Information Transmission, vol. 41, No. 4, Jul. 26, 2005, pp. 368-384.

Juditsky, et al., "Solving Variational Inequalities with Stochastic Mirror-Prox Algorithms", Retrieved at <<http://www2.isye.gatech.edu/~nemirovs/SMP.pdf>>, Jun. 2, 2008, pp. 32.

Kivinen, Jyrki, "Exponentiated Gradient Versus Gradient Descent for Linear Predictors", Retrieved at <<http://users.soe.ucsc.edu/~manfred/pubs/J36.pdf>>, Information and Computation 132, 1997, pp. 1-63.

Lan, Guanghui, "Efficient Methods for Stochastic Composite Optimization", Retrieved at <<http://www.optimization-online.org/DB_FILE/2008/08/2061.pdf>>, School of Industrial and Systems Engineering, Georgia Institute of Technology, Atlanta, GA, Jun. 21, 2008, pp. 21.

Lan, et al., "Validation Analysis of Robust Stochastic Approximation Methods", Retrieved at <<http://www2.isye.gatech.edu/~nemirovs/MP_Valid_2011.pdf>>, Feb. 4, 2011, pp. 34.

Langford, et al., "Sparse Online Learning via Truncated Gradient", Retrieved at <<http://jmlr.csail.mit.edu/papers/volume10/langford09a/langford09a.pdf>>, Journal of Machine Learning Research 10, Mar. 2009, pp. 777-801.

Lecun, et al., "Gradient-Based Learning Applied to Document Recognition", Retrieved at <<http://www.research.att.com/~haffner/biblio/pdf/lecun-98.pdf>>, Jul. 13, 1998, pp. 1.

Lu, Zhaosong, "Gradient Based Method for Cone Programming With Application to Large-Scale Compressed Sensing", Retrieved at <<http://www.math.sfu.ca/~zhaosong/ResearchPapers/gradCP.pdf>>, Sep. 3, 2008, pp. 27.

Nedic, et al., "Incremental Subgradient Methods for Nondifferentiable Optimization", Retrieved at <<http://web.mit.edu/dimitrib/www/Increm_LIDS.pdf>>, SIAM J. on Optimization, Sep. 2009, pp. 36.

Juditsky, et al., "Stochastic Approximization Approach to Stochastic Programming", Retrieved at <<http://www2.isye.gatech.edu/~nemirovs/SA_Sept25_final.pdf>>, 2009, pp. 35.

(56) References Cited

OTHER PUBLICATIONS

Nesterov, Yu, "Smooth Minimization of Non Smooth", Retrieved at <<http://www.springerlink.com/content/c7wheayx86u1vfwx/>>, Mathematical Programming, vol. 103, Issue 1, May 2005, pp. 127-152.

Nesterov, Yu, "Gradient Methods for Minimizing Composite Objective Function", Retrieved at <<http://www.optimization-online.org/DB_FILE/2007/09/1784.pdf>>, Sep. 2007, pp. 31.

Nesterov, Yu, "Primal-Dual Subgradient Methods for Convex Problems", Retrieved at <<https://commerce.metapress.com/content/b441795t5254m533/resource-secured/?target=fulltext.pdf&sid=qoxj2wbkelned45ege1fcas&sh=www.springerlink.com>>, Mathematical Programming, vol. 120, 2009, pp.221-259.

Platt, John C., "Fast Training of Support Vector Machine Using Sequential Minimal Optimization", Retrieved at <<http://research.microsoft.com/pubs/68391/smo-book.pdf>>, Aug. 14, 2000, pp. 25.

Robbins et al., "A Stochastic Approximation Method", Retrieved at <<http://projecteuclid.org/DPubS/Repository/1.0/Disseminate?view=body&id=pdf_1&handle=euclid.aoms/1177729586>>, Sep. 1951, pp. 8.

Kakade, et al., "Mind the Duality Gap: Logarithmic Regret Algorithms for Online Optimization", Retrieved at <<http://ttic.uchicago.edu/~shai/papers/KakadeSh08.pdf>>, 2008, pp. 10.

Shalev-Shwartz, et al., "Pegasos: Primal Estimated sub-Gradient Solver for SVM", Retrieved at <<http://www.machinelearning.org/proceedings/icml2007/papers/587.pdf>>, Appearing in Proceedings of the 24th International Conference on Machine Learning, Corvallis, Oregon, 2007, pp. 8.

Strassen, V., "The Existence of Probability Measures With Given Marginals", Retrieved at <<http://projecteuclid.org/DPubS/Repository/1.0/Disseminate?view=body&id=pdf_1&handle=euclid.aoms/1177700153>>, Annals of Mathematical Statistics, vol. 36, No. 2, 1965, pp. 423-439.

Tibshirani, Robert, "Regression Shrinkage and Selection via the Lasso", Retrieved at <<http://www.stat.osu.edu/~yklee/882/yong-ganglasso.pdf>>, Oct. 19, 2006, pp. 12.

Tseng, Paul, "On Accelerated Proximal Gradient Methods for Convex-Concave Optimization", Retrieved at <<http://www.math.washington.edu/~tseng/papers/apgm.pdf>>, May 21, 2008, pp. 20.

Tseng, et al., "On the Convergence of Exponential Multiplier Method for Convex Programming", Retrieved at <<http://web.mit.edu/dimitrib/www/Expmult.pdf>>, Math Programming, vol. 60, 1993, pp. 1-19.

Wright, et al., "Sparse Reconstruction by Separable Approximation", Retrieved at <<http://www.lx.it.pt/~mtf/SpaRSA/Wright_Nowak_Figueiredo_revised_twocolumns.pdf>>, 2008, pp. 14.

Zhang, Tong, "Solving Large Scale Linear Prediction Problems Using Stochastic Gradient Descent Algorithms", Retrieved at <<http://www.stat.rutgers.edu/~tzhang/papers/icml04-stograd.pdf>>, Appearing in Proceedings of the 21st International Conference on Machine Learning, Banff, Canada, 2004. pp. 8.

Zinkevich, Martin, "Online Convex Programming and Generalized Infinitesimal Gradient Ascent", Retrieved at <<http://www.cs.ualberta.ca/~maz/publications/ICML03.pdf>>, Proceedings of the Twentieth International Conference on Machine Learning (ICML-2003), 2003, pp. 8.

Boyd, et al., "Stochastic Subgradient Methods", Retrieved at <<http://see.stanford.edu/materials/lsocoee364b/04-stoch_subgrad_notes.pdf>>, Notes EE364b, Stanford University, Winter 2006-2007, Apr. 13, 2008. pp. 14.

Shalev-Shwartz, et al., "Stochastic Methods for $\phi 1$ Regularized Loss Minimization", Retrieved at <<http: http://www.cs.mcgill.ca/~icml2009/papers/262.pdf>>, Appearing in Proceedings of the 26th International Conference on Machine Learning, Montreal, Canada, 2009. pp. 8.

Do, et al., "Proximal regularization for online and batch learning", Retrieved at <<http://ai.stanford.edu/~chuongdo/papers/proximal.pdf>>, Appearing in Proceedings of the 26th International Conference on Machine Learning, Montreal, Canada, 2009. pp. 8.

Goldberg, et al., "Online Manifold Regularization: A New Learning Setting and Empirical Study", Retrieved at <<http://pages.cs.wisc.edu/~jerryzhu/pub/onlinerptree.pdf>>, 2008, pp. 15.

Tsuruoka, et al., "Stochastic Gradient Descent Training for L1-regularized Log-linear Models with Cumulative Penalty", Retrieved at <<http://www.aclweb.org/anthology/P/P09/P09-1054.pdf>>, Proceedings of the 47th Annual Meeting of the ACL and the 4th IJCNLP of the AFNLP, Aug. 2-7, 2009, pp. 477-485.

Wu, et al., "Adaptive Regularization through Entire Solution Surface", Retrieved at <<http://www.stat.umn.edu/~xshen/paper/rev.pdf>>, Jan. 2009, pp. 32.

Blitzer, et al., "Biographies, Bollywood, Boom-Boxes and Blenders: Domain Adaptation for Sentiment Classification", Retrieved at <<http://www.cs.jhu.edu/~mdredze/publications/sentiment_acl07.pdf>>, Jun. 2007, pp. 8.

Chen, et al., "Convergence Rates in Forward-Backward Splitting", Retrieved at <<http://www.math.washington.edu/~rtr/papers/rtr-ForwardBackwardSplitting.pdf>>, 1997, pp. 25.

Combettes, et al., "Signal Recovery by Proximal Forward-Backward Splitting", Retrieved at <<http://www.ann.jussieu.fr/~plc/mms1.pdf", 2005, pp. 33.

Daubechies, et al., "Accelerated Projected Gradient Method for Linear Inverse Problems with Sparsity Constraints", Retrieved at <<http://www.ricam.oeaw.ac.at/people/page/fornasier/DFL07c.pdf>>, Journal of Fourier Analysis and Applications, 2004, pp. 32.

Duchi, et al., "Efficient Projections Onto the $\rho 1$ -Ball for Learning in High Dimensions", Retrieved at <<http://www.machinelearning.org/archive/icml2008/papers/361.pdf>>, Appearing in the Proceedings of the 25th International Conference on Machine Learning, Helsinki, Finland, 2008, pp. 8.

Grangier, et al., "A Discriminative Kernel-Based Model to Rank Images from Text Queries", Retrieved at <<http://david.grangier.info/pub/papers/2007/grangier-tpami-2007.pdf, IEEE Transactions on Pattern Analysis and Machine Intelligence, 2006, pp. 14.

Hale, et al., "A Fixed-Point Continuation Method for $\rho 1$-Regularized Minimization with Applications to Compressed Sensing", Retrieved at <<http://www.caam.rice.edu/~zhang/reports/tr0707.pdf", Department of Computational and Applied Mathematics, CAAM Techincal Report, Jul. 7, 2007, pp. 45.

Hazan, et al., "Logarithmic Regret Algorithms for Online Convex Optimization", Retrieved at <<http://www.cs.princeton.edu/~ehazan/papers/colt.pdf>>, May 20, 2007, pp. 15.

Koh, et al, "An Interior-Point Method for Large-Scale $\rho 1$-Regularized Logistic Regression", Retrieved at <<http://jmir.csail.mit.edu/papers/volume8/koh07a/koh07a.pdf>>, Journal of Machine Learning Research, Jul. 2007, pp. 37.

Langford, et al., "Sparse Online Learning via Truncated Gradient", Retrieved at <<http://jmir.csail.mit.edu/papers/volume10/langford09a/langford09a.pdf>>, Journal of Machine Learning Research, Mar. 2009, pp. 25.

Meier, et al., "The Group Lasso for Logistic Regression", Retrieved at <<ftp://ftp.stat.math.ethz.ch/Research-Reports/Other-Manuscripts/buhlmann/lukas-sara-peter.pdf>>, J.R. Statist. Soc. B, 2008, pp. 53-71.

Meinshausen et al., "High Dimensional Graphs and Variable Selection with the Lasso", Retrieved at <<http://www.stats.ox.ac.uk/~meinshau/consistent.pdf>>, 2006, pp. 32.

Nesterov et al., "Gradient Methods for Minimizing Composite Objective Function", Retrieved at http://www.ecore.be/DPs/dp_1191313936.pdf>>, Sep. 2007, pp. 32.

Obozinski, et al., "Joint Covariate Selection for Grouped Classification", Retrieved at <<http://www.stat.berkeley.edu/tech-reports/743.pdf>>, Technical Report 743, Department of Statistics, UC Berkeley, Retrieved on Oct. 15, 2009, pp. 20.

Obozinski et al., "High-Dimensional Union Support Recovery in Multivariate Regression", Retrieved at <<http://www.stat.berkeley.edu/~gobo/nips1|12preproc.pdf>>, 2008, pp. 8.

Owen, Art B., "A Robust Hybrid of Lasso and Ridge Regression", Retrieved at <<http://www-stat.stanford.edu/~owen/reports/hhu.pdf>>, Oct. 2006, pp. 14.

Quattoni, et al., "An Efficient Projection for L1, Infinity Regularization", Retrieved at <<http://www.isi.upc.edu/~aquattoni/AllMyPapers/icml_09.pdf>>, 2009, pp. 8.

(56) References Cited

OTHER PUBLICATIONS

Schmidt, et al., "Optimizing Costly Functions with Simple Constraints: A Limited-Memory Projected Quasi-Newton Method", Retrieved at <<http://jmir.csail.mit.edu/proceedings/papers/v5/schmidt09a/schmidt09a.pdf>>, Appearing in Proceedings of the 12th International Conference on Artificial Intelligence and Statistics (AISTATS), Clearwater Beach, Florida, USA, 2009, pp. 456-463.

Shwartz, et al., "Logarithmic Regret Algorithms for Strongly Convex Repeated Games", Retrieved at <<http://ttic.uchicago.edu/~shai/papers/ShalevSi07report.pdf>>, May 20, 2007, pp. 16.

Shalev-Shwartz et al., "Stochastic Methods for $\rho$1-Regularized Loss Minimization", Retrieved at <<http://www.cs.mcgill.ca/~icml2009/papers/262.pdf>>, Appearing in Proceedings of the 26th International Conference on Machine Learning, Montreal, Canada, 2009, pp. 8.

Shalev-Shwartz et al., "Pegasos: Primal Estimated Sub-Gradient Solver for SVM", Retrieved at <<http://www.machinelearning.org/proceedings/icml2007/papers/587.pdf>>, Appearing in Proceedings of the 24th International Conference on Machine Learning, Corvallis, Oregon, 2007, pp. 8.

Michie, et al., "Machine Learning, Neural and Statistical Classification", Retrieved at <<http://www.maths.leeds.ac.uk/~charles/statlog/whole.pdf>>, Feb. 17, 1994, pp. 298.

Tseng, et al., "A Coordinate Gradient Descent Method for Nonsmooth Separable Minimization", Retrieved at <<http://www.csie.ntu.edu.tw/~b99902019/111Teng&Yun.pdf>>, Aug. 1, 2007, pp. 37.

Wright et al., "Sparse Reconstruction by Separable Approximation", Retrieved at <<http://www.lx.it.pt/~mtf/SpaRSA/Wright_Nowak_Figueiredo_revised_twocolumns.pdf>>, 2009, pp. 14.

Zhao et al., "On Model Selection Consistency of Lasso", Retrieved at <<http://jmir.csail.mit.edu/papers/volume7/zhao06a/zhao06a.pd>>, Journal of Machine Learning Research, Nov. 2006, pp. 23.

Zhao, et al., "Grouped and Hierarchical Model Selection through Composite Absolute Penalties", Retrieved at <<http://www.stat.berkeley.edu/tech-reports/703.pdf>>, Apr. 17, 2006, pp. 36.

Zinkevich, Martin, "Online Convex Programming and Generalized Infinitesimal Gradient", Proceedings of the Twentieth International Conference on Machine Learning (ICML-2003), Washington, DC, 2003, pp. 8.

"UCI Machine Learning Repository", Retrieved at <<http://archive.ics.uci.edu/ml/>>, Oct. 15, 2009, pp. 2.

Balakrishnan, et al., "Algorithms for Sparse Linear Classifiers in the Massive Data Setting", Retrieved at <<http://jmir.csail.mit.edu/papers/volume9/balakrishnan08a/balakrishnan08a.pdf>>, Journal of Machine Learning Research, Feb. 2008, pp. 25.

Carpenter, Bob, "Lazy Sparse Stochastic Gradient Descent for Regularized Multinomial Logistic Regression", Retrieved at <<http://lingpipe.files.wordpress.com/2008/04/lazysgdregression.pdf>>, 2008, pp. 20.

Cesa-Bianchi, et al., "Worst-Case Quadratic Loss Bounds for Prediction Using Linear Functions and Gradient Descent", Retrieved at <<http://homes.di.unimi.it/~cesabian/Pubblicazioni/J4.pdf>>, May 1996, pp. 16.

Chu, et al., "Map-Reduce for Machine Learning on Multicore", Retrieved at <<http://www.cs.stanford.edu/people/ang//papers/nips06-mapreducemulticore.pdf>>, 2006, pp. 8.

Dekel, et al., "The Forgetron: A Kernel-Based Perceptron on a Fixed Budget", Retrieved at <<http://books.nips.cc/papers/files/nips18/NIPS2005_0192.pdf>>, 2008, pp. 8.

Duchi, et al., "Online and Batch Learning Using Forward Looking Subgradients", Retrieved at <<http://www.cs.berkeley.edu/~jduchi/projects/DuchiSi09a.pdf>>, Oct. 2009, pp. 37.

Duchi, et al., "Efficient Projections Onto the $\rho$1-Ball for Learning in High Dimensions", Retrieved at http://www.machinelearning.org/archive/icml2008/papers/361.pdf>>, Appearing in the Proceedings of the 25th International Conference on Machine Learning, Helsinki, Finland, 2008, pp. 8.

Kivinen, et al., "Exponentiated Gradient Versus Gradient Descent for Linear Predictors", Retrieved at <<http://users.soe.ucsc.edu/~manfred/pubs/J36.pdf>>, Information and Computation 132, Article No. IC962612, 1997, pp. 63.

Langford, et al., "Vowpal Wabbit (Fast Online Learning)", Retrieved at <<http://hunch.net/~vw/>>, Oct. 15, 2009, pp. 2.

Lee, et al., "Efficient Sparse Coding Algorithms", Retrieved at <<http://www.stanford.edu/~hllee/nips06-sparsecoding.pdf>>, Oct. 15, 2009, pp. 8.

Lewis et al., "RCV1: A New Benchmark Collection for Text Categorization Research", Retrieved at <<http://jmir.csail.mit.edu/papers/volume5/lewis04a/lewis04a.pdf>>, Journal of Machine Learning Research 5, Apr. 2004, pp. 37.

Littlestone, Nick, "Learning Quickly When Irrelevant Attributes Abound: A New Linear-Threshold Algorithms", Retrieved at <<http://www.cs.utsa.edu/~bylander/cs6243/littlestone1988.pdf>>, Machine Learning 2, 1988, pp. 285-318.

Littlestone, et al., "On-Line Learning of Linear Functions", Retrieved at <<http://www.phillong.info/publications/linear.pdf>>, 1991, pp. 23.

Sjostrand, Karl, "Matlab Implementation of LASSO, LARS, the Elastic Net and SPCA", Retrieved at <<http://www2.imm.dtu.dk/pubdb/views/publication_details.php?id=3897>>, Oct. 15, 2009, p. 1.

Tibshirani, Robert, "Regression Shrinkage and Selection via the Lasso", Retrieved at <<http://www.statistik.tu-dortmund.de/fileadmin/user_upload/Lehrstuehle/Genetik/MW0910/Tibshirani1996.pdf>>, Journal of the Royal Statistical Society, Series B (Methodological), vol. 58, No. 1, 1996, pp. 267-288.

\* cited by examiner

REGULARIZED DUAL AVERAGING METHOD FOR STOCHASTIC AND ONLINE LEARNING

BACKGROUND

In general, machine learning operates by processing a set of examples to develop a learned mechanism, such that when given new data the learned mechanism can correctly estimate a result. For example, machine learning may be used to train a classifier with samples, such that in later use, the classifier correctly classifies unknown input, e.g., a handwritten character.

One problem that occurs in machine learning is overfitting, in which the mechanism being learned fits the particular set of examples too closely. When enough of the examples are bad examples (e.g., noisy or associated with other errors such as mislabeled), the learned mechanism learns relatively too much from the bad examples and is thus not as accurate when later processing new data. Regularization generally refers to preventing such overfitting.

Online learning algorithms are those that process samples sequentially as each becomes available, in contrast to having to process significant other data (e.g., a whole set of samples together). In general, online algorithms operate by repetitively drawing random examples, one at a time, and adjusting learning variables using calculations that are usually based on the single example only. Because of the sequential, one-at-a-time approach, online algorithms are often used to solve large-scale learning problems.

Traditional online algorithms, such as stochastic gradient descent, have limited capability for solving regularized learning problems. What is needed are methods for stochastic and/or online learning that obtain desired regularization effects, e.g., desired sparsity in the training parameters.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a learned mechanism (e.g., a classifier) is developed by solving a minimization problem that includes a loss function and a regularization term. Data items are processed, including computing and maintaining information (e.g., a running weight average) representative of a computed optimization variable and previously computed optimization variables. A subgradient is also computed based upon the optimization variable, and information (e.g., a running subgradient average) representative of the computed subgradient and previously computed subgradients is computed and maintained. A next iterate may be computed by solving an auxiliary minimization problem to obtain desired regularization effects, such as sparsity in the case of L1-regularization.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a class of online algorithms, referred to herein as regularized dual averaging (RDA) methods, which obtain effectively regularized solutions for stochastic learning and/or online optimization problems by exploiting the regularization structure in an online setting. In one implementation, an algorithm computes sequential solutions for the stochastic learning and online optimization problems by solving a minimization problem that involves the running average of the previous subgradients of the cost function and the whole regularization term, without any discounting or diminishing weight. For general convex regularizations, the regularized dual averaging method achieves an optimal convergence rate $O(1/\sqrt{t})$, where t is the number of iterations or samples in an online algorithm. For strongly convex regularizations, a variant that uses different parameters is also described that has a faster convergence rate, namely $O(\ln t/t)$.

While various examples are described herein, such as online optimization for developing a classifier, the regularized dual averaging algorithms may be used in any application that is directed towards such online optimization problems. Other example applications include online prediction of time series and sequential investment, batch learning, support vector machines, logistic regression, compressed sensing, and so forth. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing, and stochastic and/or online learning in general.

Figure 1:
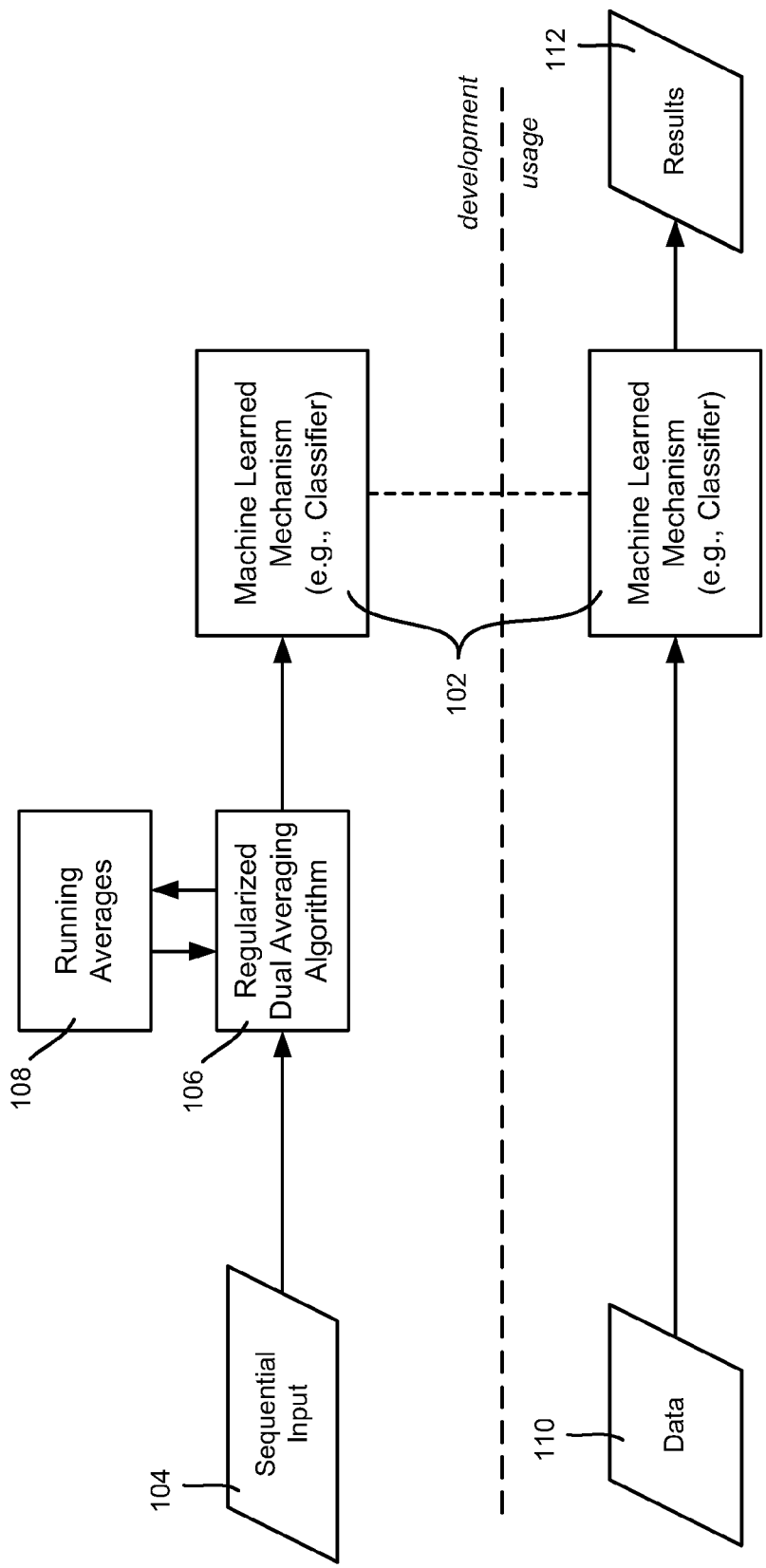
FIG. 1 is a block diagram showing example components for developing and using a machine-learned mechanism via regularized dual averaging methods.

Turning to FIG. 1, there is shown a block diagram representing example components for online development and subsequent usage of a machine learned mechanism 102, such as a classifier. Sequential input 104 is provided to a regularized dual averaging algorithm 106 (described below with reference to FIGS. 2 and 3), which among other operations computes and maintains running averages 108. When the input data 104 has been processed, based on a number of samples or iterations, the machine learned mechanism 102 is developed and ready for use.

In usage, unknown data 110 is input to the machine learned mechanism 102, which then outputs appropriate results 112, e.g., a classification result, or a set of probabilities for possible results. For example, if the data 110 corresponds to a handwritten character, the machine learned mechanism 102 may output a recognized character, or a set of possible characters each with a probability value as to its likelihood of correctness.

The dual averaging algorithm 106 addresses the problem of obtaining effectively regularized solutions for stochastic learning and/or online optimization problems. More specifically, there is described an algorithm for solving two classes of problems. A first class of problems are stochastic learning problems of the form:

$$\underset{w}{\text{minimize}}\left\{\phi(w) \triangleq E_z f(w, z) + \Psi(w)\right\}$$

where $w \in R^n$ is the optimization variable (called weights in many learning problems), $z=(x,y)$ is an input-out pair of data items drawn from an (unknown) underlying distribution, $f(w, z)$ is the loss function of using $w \in R^n$ and $x \in R^n$ to predict y and it is usually assumed to be convex in w, $E_z$ denotes taking expectation with respect to the random variable z, and the regularization term $\Psi(w)$ is a closed convex function.

Examples of the loss function $f(w,z)$ include least squares, hinge loss and logistic regression. Examples of the regularization term $\Psi(w)$ include $l_1$-regularization (also referred to as L1-regularization with a capital letter 'L' and no following subscript), $l_2$-regularization (also referred to as L2-regularization with a capital letter 'L' and no following subscript) and convex constraints in which $\Psi(w)$ is the indicator function of a closed convex set C. More particularly:

$l_1$-regularization: $\Psi(w)=\lambda\|w\|_1$ with $\lambda>0$. With $l_1$-regularization, a relatively sparse solution is desired, that is, with many entries of the weight vector w being zeroes.

$l_2$-regularization: $\Psi(w)=(\sigma/2)\|w_2{}^2\|$ with $\sigma>0$. When $l_2$-regularization is used with the hinge loss function, this provides the standard setup of support vector machines.

Convex constraints: $\Psi(w)$ is the indicator function of a closed convex set C, i.e., $$\Psi(w) = I_C(w) \triangleq \begin{cases} 0, & \text{if } w \in C, \\ +\infty, & \text{otherwise.} \end{cases}$$

For example, $C=\{w \in R_+{}^n\}$, or $C=\{w \in R^n | \|w\|_1 \leq \gamma\}$ for some $\gamma>0$.

Mixed regularizations such as $\Psi(w)=\lambda\|w\|_1+(\sigma/2)\|w_2{}^2\|$ may also be considered.

The above examples apply to a wide range of practical problems in machine learning, including pattern recognition and classification, linear and logistic regression, and large-scale compressed sensing. One particular useful case is sparse stochastic and online learning, that is, when the regularization term $\Psi(w)=\lambda\|w\|_1$, where $\lambda$ is a regularization parameter and $\|w\|_1$ denotes the $l_1$-norm of the weight vector w, i.e., $\|w\|_1=\Sigma_{i=1}{}^n|w_i|$. In a batch learning case, solving the $l_1$-regularized problems tends to produce sparse solutions (only a few nonzero elements in the vector w), while still maintaining good learning performance, e.g., in terms of classification errors. The sparsity in the weight vector w directly translates into a fewer number of queried features for each sample in the data set, and thus saves operational cost in practical implementations.

However, the desired regularization effects (especially sparsity under L1-regularization) have not been achieved by previous stochastic or online algorithms. Indeed, while stochastic or online algorithms are the only feasible approaches in terms of computational complexity for solving very large scale learning problems, previous methods cannot effectively find regularized solutions.

A second class of problems includes regularized online convex optimization problems. In online optimization, an online algorithm generates a sequence of decisions $w_t$, by processing a data item at a time, for $t=1, 2, 3, \ldots$. At each time t, a previously unknown cost function $f_t$ is revealed, and a loss $f_t(w_t)$ encountered. The cost functions are assumed convex for all $t \geq 1$. A general goal of the online algorithm is to ensure that the total cost up to each time t, $\Sigma_{\tau=1}{}^t f_\tau(w_\tau)$, is not much larger than $\min_w \Sigma_{\tau=1}{}^t f_\tau(w)$ the smallest total cost of any fixed decision w from hindsight. The difference between these two costs is called the regret of the online algorithm. Applications of online optimization include online prediction of time series and sequential investment.

In regularized online optimization problems, an online algorithm generates a sequence of decision vectors $w_t$, for $t=1, 2, 3, \ldots$, and encounters a convex loss $f_t(w_t)+\Psi(w_t)$ where the loss function $f_t$ is only revealed after $w_t$ is given. A general goal of the online algorithm is to make the regret $$R_t = \sum_{\tau=1}^{t}(f_\tau(w_\tau) + \Psi(w_\tau)) - \min_w \sum_{\tau=1}^{t}(f_\tau(w) + \Psi(w)),$$

which is measured against the best fixed decision from hindsight, as small as possible.

The algorithm can obtain effective regularized online solutions similar as in the stochastic learning case, and guarantee that the regret $R_t$ only grows with order $O(\sqrt{t})$. If the regularization function $\Psi(w)$ is strongly convex, the algorithm can obtain regret bound $O(\ln t)$.

The algorithm computes the sequential solutions for the stochastic learning and online optimization problems by solving a minimization problem that involves the running average of the previous subgradients of the cost function and the original regularization term without any discounting or diminishing weight. In cases such as $\Psi(w)=\lambda\|w\|_1$, the minimization problem at each iteration has a closed-from solution that can be computed efficiently with O(n) complexity. Note that while computing and maintaining a running average is described, it is understood that this is only one suitable approximation, and that it is feasible to compute and maintain information representative of the computed subgradient and previously computed subgradients that is not a running average, but another suitable computation.

In $l_1$-regularized stochastic learning, $\Psi(w)=\lambda\|w\|_1$. Even with relatively large $\lambda$, the classical stochastic gradient descent method usually does not generate sparse solutions because only in very rare cases do two float numbers add up to zero. As described herein, regularized dual averaging (RDA) methods exploit the regularization structure in an online setting. More specifically, each iteration of the RDA method takes the form:

$$w_{t+1} = \underset{w}{\arg\min}\left\{\langle \bar{g}_t, w\rangle + \Psi(w) + \frac{\beta_t}{t}h(w)\right\}$$

where $\beta_t$ is a sequence of input parameters that is nonnegative and nondecreasing with t, h(w) is a strongly convex function with modulus 1, and $\bar{g}_t$ is the dual average defined as $$\bar{g}_t = \frac{1}{t}\sum_{\tau=1}^{t}g_\tau.$$

Essentially, at each iteration as described below, this method minimizes the sum of three terms, namely a linear function obtained by averaging all previous subgradients (the dual average), the original regularization function $\Psi(w)$ and an additional strongly convex regularization term $$\frac{\beta_t}{t} h(w)$$

that diminishes to zero as t increases. Note that unlike one dual averaging method, the regularized dual averaging method described herein considers the regularization term $\Psi(w)$.

The general RDA method is shown below and also in FIG. 2:

---

Input: initial vector $w_0$, parameters $\gamma > 0$, an integer T which specifies length of iteration, and a strongly convex function h(w) with modulus 1 such that $w_0 = \underset{w}{\arg\min}\, h(w) \in \underset{w}{\mathrm{Argmin}}\, \Psi(w)$ (step 202)

And a pre-defined nonnegative, nondecreasing sequence $\beta_t$ for $t \geq 1$.

Initialization: set t=1 and three vectors in $R^n$ as follows: $w_1 = w_0$, $\overline{w}_0 = w_0$, and $\overline{g}_0 = 0$. (step 204)

For t = 1, ..., T (step 206a/206b)
  Read data $z_t$ and let $f_t(w) = f(w, z_t)$ (step 208)
  Compute a subgradient $g_t \in \partial f_t(w_t)$. (step 210)
  Compute the average weight $\overline{w}_t$ and the average subgradient $\overline{g}_t$ as follows: (step 212)

$$\overline{w}_t = \frac{t-1}{t}\overline{w}_{t-1} + \frac{1}{t}w_t,\ \overline{g}_t = \frac{t-1}{t}\overline{g}_{t-1} + \frac{1}{t}g_t$$

Compute the next iterate $w_{t+1}$ by solving the following minimization problem: (step 214)

$$w_{t+1} = \underset{w}{\arg\min}\left\{\langle \overline{g}_t, w\rangle + \Psi(w) + \frac{\beta_t}{t}h(w)\right\}$$

where $$\langle \overline{g}_t, w\rangle = \sum_{i=1}^{n} \overline{g}_t^{(i)} w^{(i)}$$

is the inner product between two vectors in $R^n$.
End for. (step 206a/206b)

---

Note that at step 208, the loss function $f_t(w)$ may be directly specified.

The calculation of $\overline{w}_t$ is only needed for stochastic learning tasks, for which it will be used to classify new data. For online learning tasks, the step for computing $\overline{w}_t$ can be skipped.

For general convex regularization $\Psi(w)$, setting the sequence $\beta_t = \gamma\sqrt{t}$, where $\gamma > 0$ is an input parameter, leads to a convergence rate $$O\left(\frac{1}{\sqrt{t}}\right)$$

for stochastic learning, or equivalently, a regret bound of $O(\sqrt{t})$ for online optimization. Any sequence $\beta_t$ that grows on the order of $\sqrt{t}$ gives the same convergence result.

For strongly convex regularization $\Psi(w)$, any nonnegative and nondecreasing sequence $\beta_t$ that grows no faster than $O(\ln t)$ gives a convergence rate of $O(\ln t/t)$ for stochastic learning, or equivalently a regret bound of $O(\ln t)$ for online optimization. Such sequences include, but not limited to the following:
  Positive constant sequences. For example, let $\beta_t = \sigma$ for all t, where $\sigma$ is the convexity parameter of $\Psi(w)$.
  The logarithmic sequence $\beta_t = \sigma(1 + \ln t)$ for all $t \geq 1$.
  The zero sequence $\beta_t = 0$ for all $t \geq 1$.

A significant difference of the regularized dual averaging method over prior solutions is that it uses the whole regular-ization $\Psi(w)$, without any discounting weight, in solving for the next solution $w_{t+1}$. Previous solutions only take a subgradient of $\Psi(w)$ or discount the regularization term by multiplying it with a small constant on the order of $$\frac{1}{\sqrt{t}}.$$

A direct advantage of regularized dual averaging over previous methods is that obtains solutions with much stronger regularization effects.

In the most widely used case of $l_1$-regularization, that is, when $\Psi(w) = \lambda\|w\|_1$, the strongly convex function h can be chosen as $$h(w) = \frac{1}{2}\|w\|_2^2 + \rho\|w\|_1$$

for any $\rho \geq 0$, and the all-zero vector $w_0 = 0$ satisfies the specified condition for input parameters. In this case, the minimization problem in the third step in the above algorithm has a closed-form solution that can be computed very efficiently with $O(n)$ complexity. For clarity, details of the more specialized $l_1$-RDA method with an input sequence $\beta_t = \gamma\sqrt{t}$ are set forth below:

---

Input: initial vector $w_0$, parameters $\gamma > 0$ and $\rho \geq 0$, an integer T which specifies
  length of iteration. (step 302)
Initialization: set t=1 and the three vectors in $R^n$ to the zero vector: $w_1 = 0$, $\overline{w}_0 = 0$, and $\overline{g}_0 = 0$. (step 304)
For t = 1, ..., T (step 306a/306b)
  Read data $z_t$ and let $f_t(w) = f(w, z_t)$. (step 308)
  Compute a subgradient $g_t \in \partial f_t(w_t)$. (step 310)
  Compute the average weight $\overline{w}_t$ and the average subgradient $\overline{g}_t$ as follows: (step 312)

$$\overline{w}_t = \frac{t-1}{t}\overline{w}_{t-1} + \frac{1}{t}w_t,\ \overline{g}_t = \frac{t-1}{t}\overline{g}_{t-1} + \frac{1}{t}g_t$$

Let $\lambda_t = \lambda + \dfrac{\gamma\rho}{\sqrt{t}}$, and compute the next iterate $w_{t+1}$ as follows: (step 314)

$$w_{t+1}^{(i)} = \begin{cases} 0 & \text{if } |\overline{g}_t^{(i)}| \leq \lambda_t \\ -\dfrac{\sqrt{t}}{\gamma}(\overline{g}_t^{(i)} + \lambda_t) & \text{if } \overline{g}_t^{(i)} < -\lambda_t \\ -\dfrac{\sqrt{t}}{\gamma}(\overline{g}_t^{(i)} - \lambda_t) & \text{if } \overline{g}_t^{(i)} > \lambda_t \end{cases} \quad \text{for } i = 1, \ldots, n.$$

End for. (step 306a/306b)

---

Note that at step 308, the loss function $f_t(w)$ may be directly specified.

Again, a significant difference from previous methods is the much stronger regularization effect resulted from using a truncation threshold $\lambda_t$ that is at least as large as the original parameter $\lambda$, in contrast to previous methods that use a truncation threshold on the order of $$\frac{\lambda}{\sqrt{t}},$$

which is much smaller. A direct advantage of using a much larger truncation threshold is that the solutions $w_t$ are much more sparse than previous methods. The sparsity directly translates into fewer features that need to be queried and savings of operational cost such as time or money.

The $l_1$-regularized dual averaging shown above and in FIG. 3 is a particular case of the regularized dual averaging method described with reference to FIG. 2. In particular, here $E=R^n$ and $\Psi(w)=\|w\|_1$. In addition, the strongly convex function $h(w)$ is replaced with a parameterized version:

$$h_\rho(w) = \frac{1}{2}\|w\|_2^2 + \rho\|w\|_1,$$

where $\rho \geq 0$ is a sparsity-enhancing parameter. Note that $h_\rho(w)$ is strongly convex with modulus 1 for any $\rho \geq 0$. Whereby the convergence results still apply. With this change, the next iterate equation becomes:

$$w_{t+1} = \underset{w}{\mathrm{argmin}}\left\{\langle \bar{g}_t, w\rangle + \lambda\|w\|_1 + \frac{\gamma}{\sqrt{t}}\left(\frac{1}{2}\|w\|_2^2 + \rho\|w\|_1\right)\right\}$$

$$= \underset{w}{\mathrm{argmin}}\left\{\langle \bar{g}_t, w\rangle + \lambda_t\|w\|_1 + \frac{\gamma}{2\sqrt{t}}\|w\|_2^2\right\},$$

where $\lambda_t = \lambda + \gamma\rho/\sqrt{t}$. The above minimization problem has a closed-form solution given at step 314.

The $l_1$-regularization may be only on part of the optimization variables. For example, in support vector machines or logistic regression, it is usually desirable to have the bias terms be free of regularization. In this case, suppose $w^{(j)}$ is a component for which regularization is not wanted, whereby the jth component may be replaced by:

$$w_{t+1}^{(j)} = \underset{\omega}{\mathrm{argmin}}\left\{\bar{g}_t^{(j)}\omega + \frac{\gamma}{2\sqrt{t}}\omega^2\right\} = -\frac{\sqrt{t}}{\gamma}\bar{g}_t^{(j)}.$$

The $l_1$-regularized dual averaging method converges in expectation to an optimal solution to the stochastic learning problem with the regularization parameter $\lambda$, despite a larger effective regularization parameter $\lambda+\gamma\rho/\sqrt{t}$ at each step t. Setting $\rho>0$ is particularly useful for obtaining sparse online solutions even without the explicit $l_1$-regularization in the objective function, i.e., when $\lambda=0$. In this case, each step of the method applies $l_1$-regularization with the diminishing weight $\gamma\rho/\sqrt{t}$.

The following sets forth some examples using the RDA algorithm with strongly convex regularizations:

$l_2$-regularization:

$$C = R^n, \quad h(w) = \frac{1}{2}\|w\|_2^2 \text{ and } \Psi(w) = \sigma h(w).$$

In this case, using $\beta_t = 0$ for all $t \geq 1$ leads to $$w_{t+1} = -\frac{1}{\sigma}\bar{g}_t = -\frac{1}{\sigma t}\sum_{\tau=1}^{t} g_\tau.$$

Kullback-Leibler (KL) divergence regularization: $C=S_n$ is the standard simplex, and $\Psi(w)=\sigma D_{KL}(w\|p)$, where $p \in S_n$ is a given probability distribution and $$D_{KL}(w\|p) \triangleq \sum_{i=1}^{n} w^{(i)}\ln\left(\frac{w^{(i)}}{p^{(i)}}\right).$$

Here $D_{KL}(w\|p)$ is strongly convex with respect to $\|w\|_1$ with modulus 1. In this case, setting $\beta_t = 0$ for $t \geq 1$ leads to $$w_{t+1}^{(i)} = \frac{1}{Z_{t+1}} p^{(i)} \exp\left(-\frac{1}{\sigma}\bar{g}_t^{(i)}\right),$$

where $Z_{t+1}$ is a normalization parameter such that:

$$\sum_{i=1}^{n} w_{t+1}^{(i)} = 1.$$

KL divergence regularization has the pseudo-sparsity effect meaning that most elements in w can be replaced by elements in the constant vector p without significantly increasing the loss.

Exemplary Operating Environment

Figure 2:
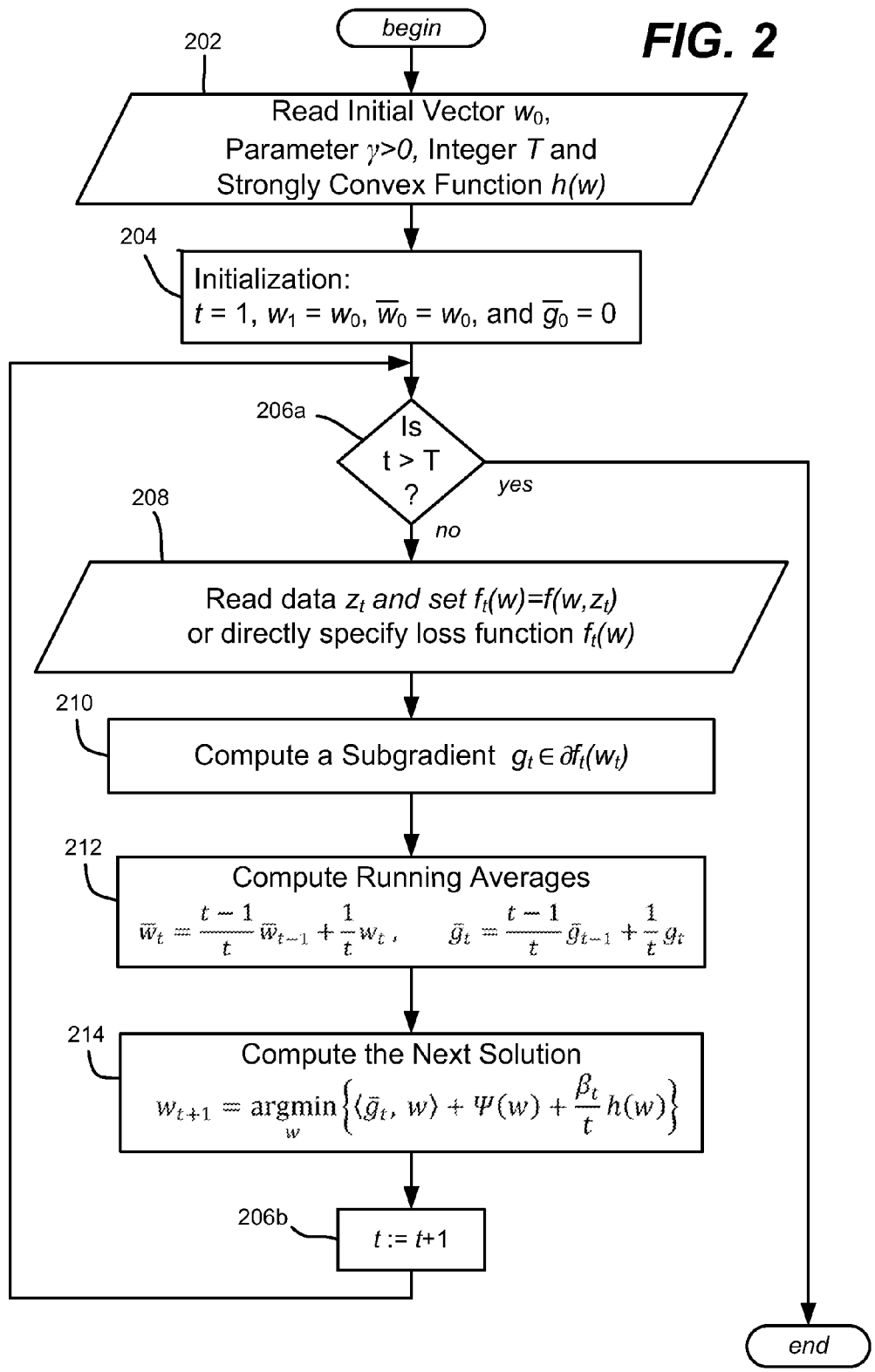
FIG. 2 is a flow diagram representing a general regularized dual averaging method.
Figure 3:
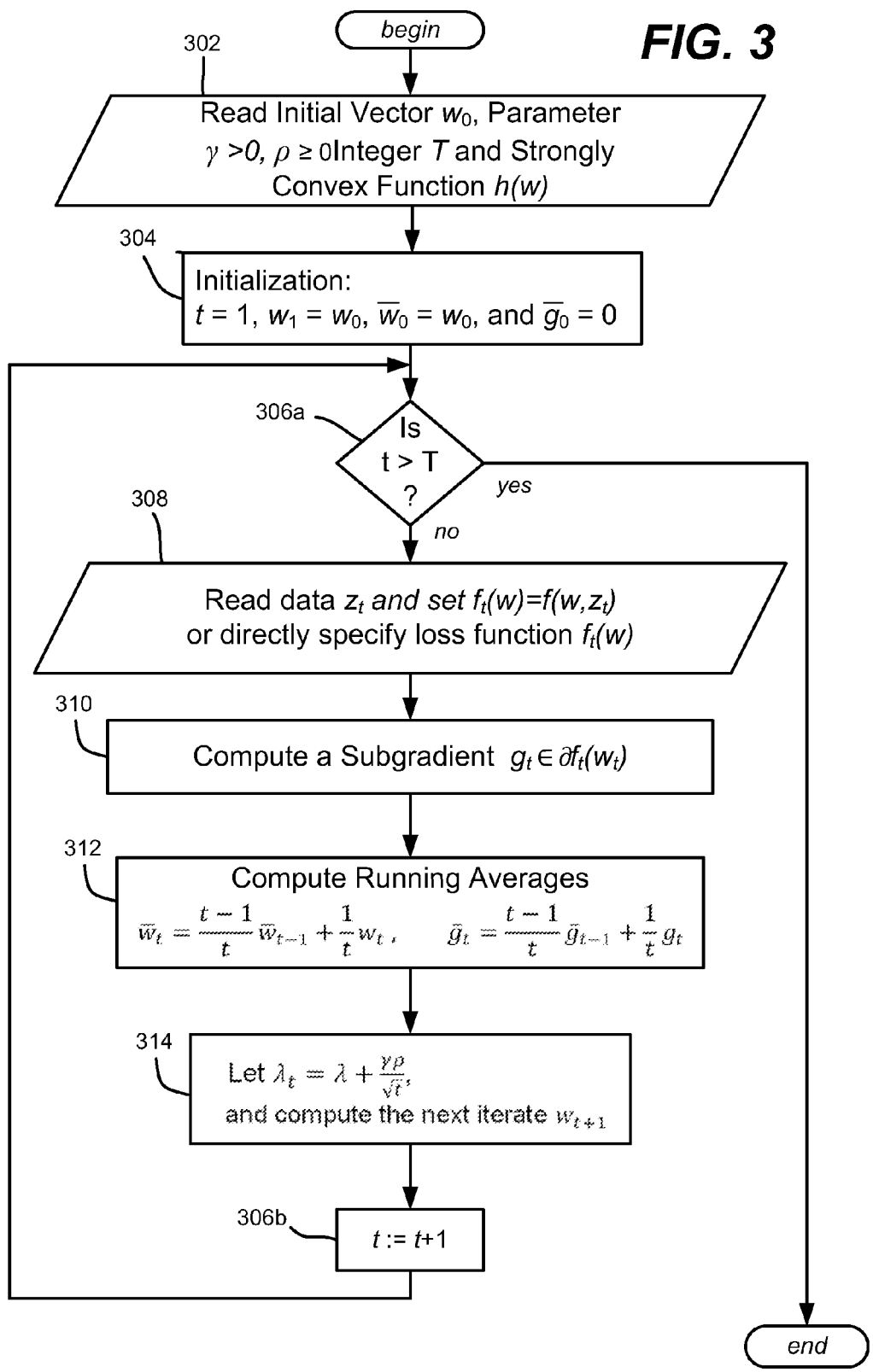
FIG. 3 is a flow diagram representing an L1-regularized dual averaging method.
Figure 4:
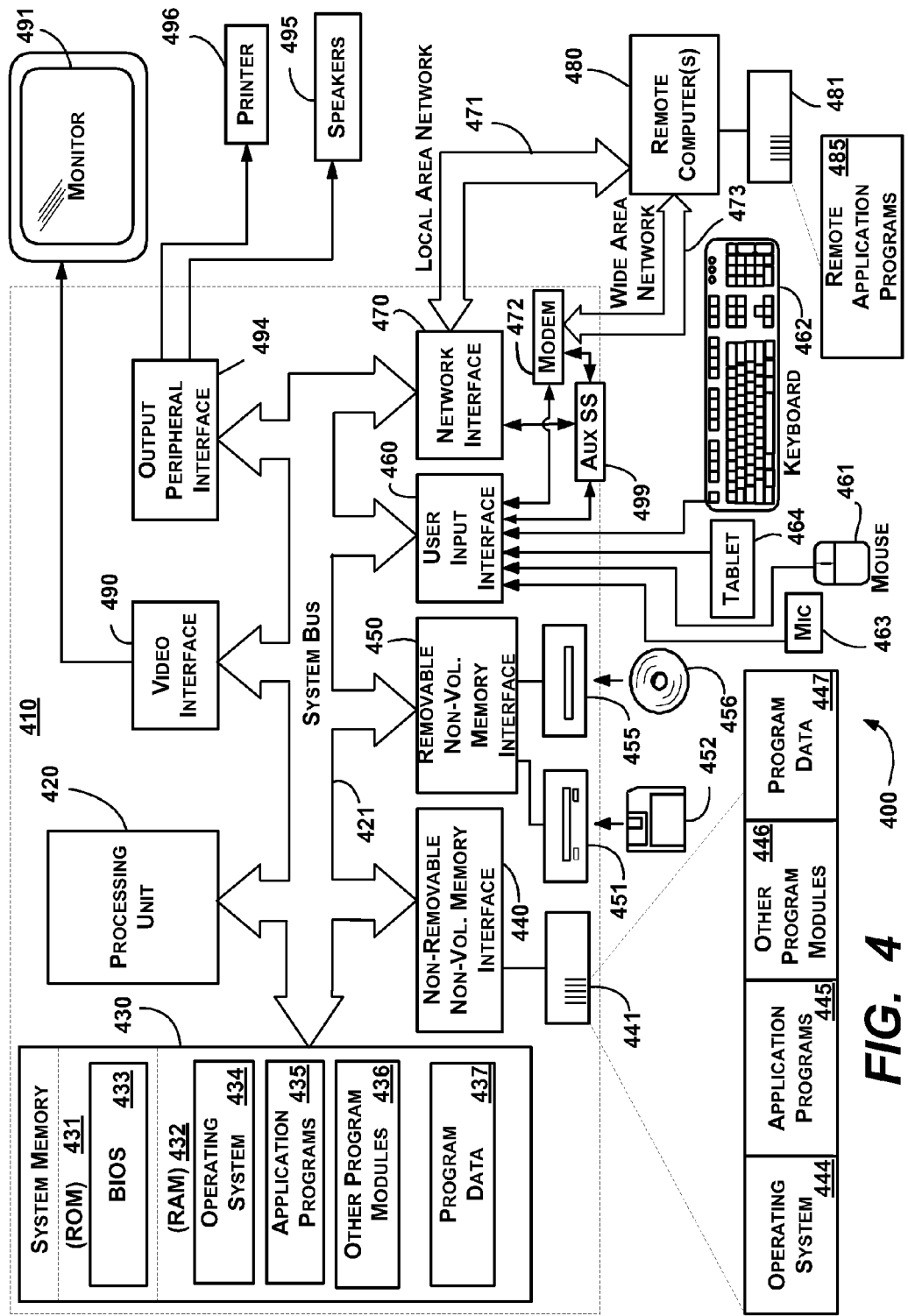
FIG. 4 shows an illustrative example of a computing environment into which various aspects of the present invention may be incorporated.

FIG. 4 illustrates an example of a suitable computing and networking environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a computer-implemented method performed on at least one processor, comprising, developing a learned mechanism for use in outputting a result given input data, including solving a minimization problem that includes a loss function and a regularization term, including processing each data item of a set of data, and for each data item, computing and maintaining information representative of a computed optimization variable and previously computed optimization variables, computing a subgradient based upon the optimization variable, and maintaining information representative of the computed subgradient and previously computed subgradients, wherein computing and maintaining the information representative of the computed optimization variable and the previously computed optimization variables comprises computing and maintaining a running optimization variable average, and wherein computing the subgradient based upon the optimization variable and maintaining the information representative of the computed subgradient and previously computed subgradients further comprises computing and maintaining a running subgradient average, wherein the regularization term utilized is a whole regularization term, and further wherein the regularization term includes $L_1$-regularization.

2. The computer-implemented method of claim 1 wherein solving the minimization problem comprises minimizing the sum of a linear function obtained by averaging the previous subgradients, the regularization function without any discounting factor, and a weighted convex regularization term.

3. The computer-implemented method of claim 1 wherein solving the minimization problem comprises minimizing regret.

4. The computer-implemented method of claim 1 solving the minimization problem comprises iterating for a plurality of examples in the set of data.

5. The computer-implemented method of claim 1 wherein the regularization term includes $L_2$-regularization.

6. The computer-implemented method of claim 1 wherein the regularization term includes convex constraints.

7. In a computing environment, a system comprising, a learned mechanism, wherein the learned mechanism is configured to use a dual averaging method that solves a minimization problem that includes a loss function and a regularization term, the learning performed by processing data to obtain a running average for optimization variables and a running average for subgradients.

8. The system of claim 7 wherein the learned mechanism comprises a classifier, a mechanism for online prediction of time series, a mechanism for sequential investment, a mechanism for batch learning, a support vector machine, a mechanism for determining logistic regression, a mechanism for compressed sensing, a mechanism for determining least squares or a mechanism for determining hinge loss.

9. The system of claim 7 wherein the minimization problem is solved by minimizing the sum of a linear function obtained by averaging the subgradients, the regularization function and a convex regularization term.

10. The system of claim 7 wherein the minimization problem is solved by minimizing regret.

11. The system of claim 7 wherein the regularization term includes $L_1$-regularization.

12. The system of claim 7 wherein the regularization term includes $L_2$-regularization.

13. The system of claim 7 wherein the regularization term includes convex constraints.

14. The system of claim 7 wherein the regularization term comprises mixed regularizations.

15. An apparatus comprising a processor and one or more computer-readable storage media having computer-executable instructions, which when executed perform steps, comprising:
    (a) reading a first data item;
    (b) computing a subgradient based upon a loss function;
    (c) computing a running average for an optimization variable based upon the current data and any previous running average corresponding to that optimization variable;
    (d) computing a running average for the subgradient based upon the current subgradient and any previous running average corresponding to that subgradient;
    (e) computing a next iterate; and
    (f) reading a next data item and returning to step (b) until a set of data items is processed.

16. The one or more computer-readable storage media of claim 15 wherein computing the next iterate comprises solving a minimization problem.

17. The one or more computer-readable storage media of claim 16 wherein solving the minimization problem comprises minimizing regret.

* * * * *